Sept. 19, 1961   B. M. OLIVER   3,001,131
AUTOMATIC METER CALIBRATOR
Filed June 30, 1958
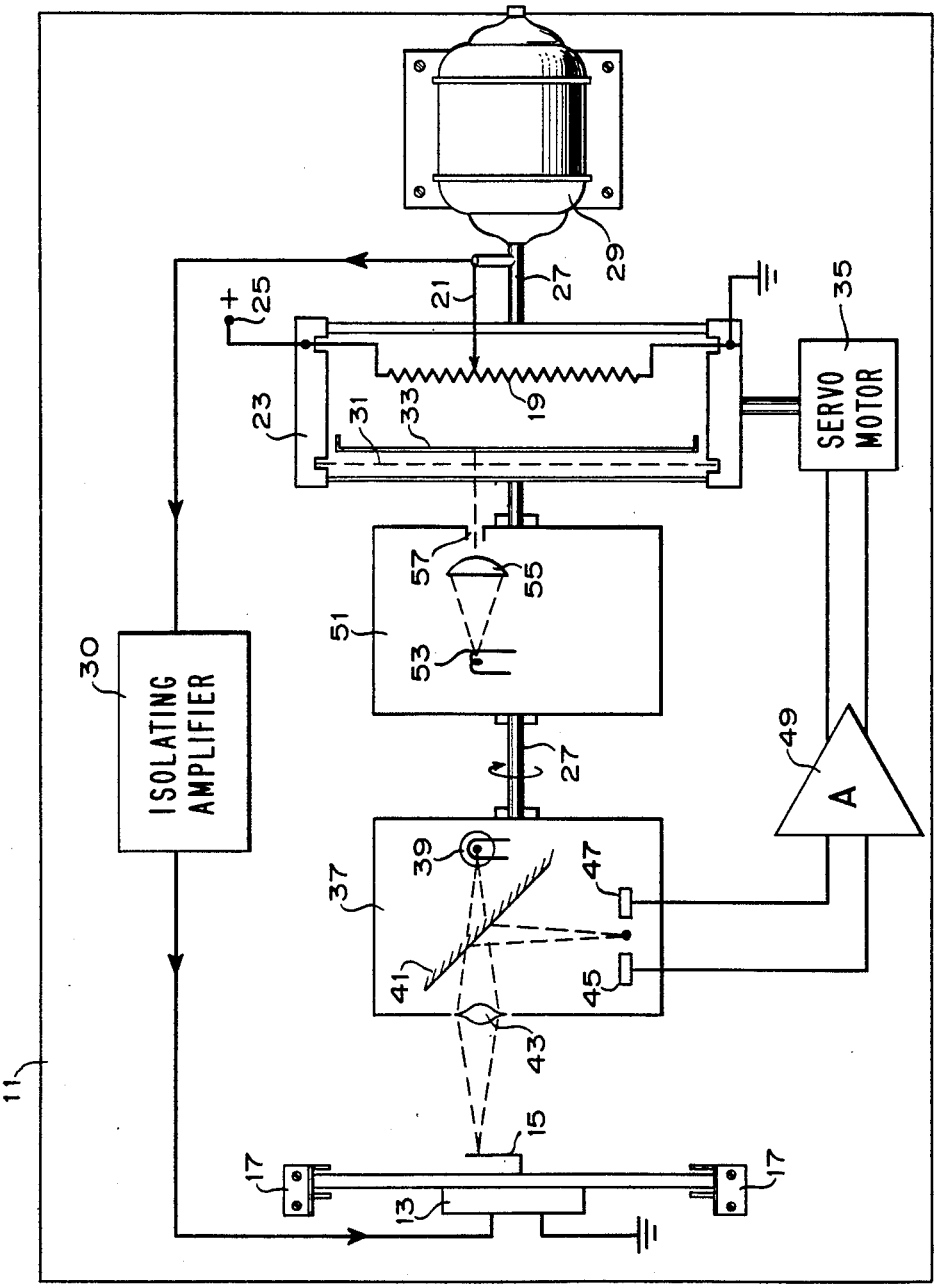
INVENTOR
BERNARD M. OLIVER
BY
ATTORNEY

United States Patent Office 3,001,131
Patented Sept. 19, 1961

3,001,131
AUTOMATIC METER CALIBRATOR
Bernard M. Oliver, Palo Alto, Calif., assignor to Hewlett-Packard Company, Palo Alto, Calif., a corporation of California
Filed June 30, 1958, Ser. No. 745,407
4 Claims. (Cl. 324—74)

This invention relates to an automatic meter calibrator for accurately calibrating and printing the scales of an indicating instrument.

The response characteristics of indicating instruments are seldom if ever identical in spite of attempts to make them so. The use of mass-produced scales, designed for an "average" instrument, results in insturments of reduced accuracy. It would therefore be desirable to equip each instrument with a scale calibrated to the individual characteristics of that instrument, provided practical apparatus to do so automatically were available.

An object of this invention is to provide a simple and practical apparatus capable of printing scales which are custom-made for each indicating instrument.

Other and incidental objects of this invention will be apparent from a reading of this specification and an inspection of the accompanying drawing which shows an embodiment of this invention. Although this invention is applicable to a variety of indicating nstruments, it will be described in connection with the automatic calibration and the printing of scales of direct-current voltmeters.

Referring now to the drawing there is shown a base 11 on which an indicating instrument, in this instance a direct-current voltmeter 13 having a pointer 15, may be fixedly mounted by means of brackets 17. The physical condition to be measured by the voltmeter 13 is a voltage obtained from a potentiometer comprising a resistor 19 and a sliding contact 21. The resistor 19 is mechanically mounted on movable mounting means such as housing 23, and electrically connected between a power supply terminal 25 and ground. The sliding contact 21 is mounted on a shaft 27 which is driven by a motor 29, and is connected to the voltmeter 13 through an isolating amplifier 30. The output of the amplifier 30 is a current which varies linearly with the amplifier input, and its purpose is to prevent the current flowing through the meter 13 from loading the potentiometer. The movable housing 23 holds a master scale 31 for the voltmeter 13, while a photosensitive blank scale 33 is fixedly mounted on the base 11. The movable housing 23 is mounted on the shaft 27, but is free to rotate about the shaft 27, its motion being controlled by a servomotor 35. A housing 37, mounted on a shaft 27, contains a light source 39 which projects a beam of light through a half-silvered mirror 41 and through a lens 43 onto the pointer 15. The image of the pointer 15 is reflected by the half-silvered mirror 41 between or onto one of a pair of photo-conductive cells 45 and 47. The output of the photocells 45 and 47 is fed through amplifier 49 to the servomotor 35 which controls the position of the housing 23. Another housing 51, also mounted on shaft 27, contains a light source 53 which projects a beam of light through a lens 55 and a narrow slit 57 onto the master scale 31 and the photosensitive blank scale 33.

The operation of the apparatus shown in the drawing is as follows: let us assume that the sliding contact 21 is at ground potential, that the slit 57 is positioned in front of the zero marking on the master scale 31, and that the image of the pointer 15 is centered between the photoconductive cells 45 and 47. Let us now assume that the motor 29 slowly rotates the shaft 27 on which are mounted sliding contact 21, housing 37 and housing 51. The sliding contact 21 travels on the resistor 19 and applies an increasing current to the meter 13. The pointer 15 of the meter 13 travels in response to this increasing current. If the angular movement of the pointer 15 is the same as the angular movement of the shaft 27, the image of the pointer 15 remains centered between the two photo-conductive cells 45 and 47. Meanwhile, as the housing 51 rotates on the shaft 27, the light beam through the slit 57 scans the master scale 31 and prints its markings on the photosensitive blank scale 33.

If the angular movement of the pointer 15 does not follow that of the shaft 27 the image of the pointer 15 is displaced onto one of the photocells 45 or 47 thereby producing an error signal which is passed through amplifier 49 and applied to the servomotor 35. The servomotor 35 changes the angular position of the movable housing 23 and therefore the position of the resistor 19 with respect to the sliding contact 21, and in so doing adjusts the current applied to the meter 13 so as to recenter the image of the pointer 15 between the photoconductive cells 45 and 47. At the same time the change in the angular position of the movable housing 23 shifts the angular position of the master scale 31 with respect to the photosensitive blank scale 33 and thus introduces into the markings scale 33 the same non-linearities that are exhibited by the meter 13.

The system in accordance with the illustrated embodiment of this invention thus provides practical apparatus on which a meter to be calibrated may be fixedly mounted. This apparatus tracks the response of the meter to a physical condition which is made to vary throughout the range of the meter, and continuously prints a scale which corrects for any non-linearities in the meter from information derived from the tracking means.

I claim:

1. In a system for calibrating and printing a scale for a meter designed to measure a physical condition applied thereto: a base, means to mount said meter fixedly upon said base, a source of the physical condition to be measured by said meter, connecting means to connect said source to said meter, movable mounting means for said source, said movable mounting means being adapted to hold a master scale for said meter, means to mount a blank scale fixedly upon said base, tracking means to track the indication of said meter, printing means to reproduce the master scale readings on said blank scale, means to move said connecting means in synchronism with said tracking and printing means, and means to alter the position of said mounting means in response to the output of said tracking means.

2. In a system for calibrating and printing a scale for a meter designed to measure a physical condition applied thereto: a base, means to mount said meter fixedly upon said base, a source of the physical condition to be measured by said meter comprising a potentiometer having a resistor, means to connect said source to said meter comprising a sliding contact for said potentiometer, movable mounting means for said resistor, said movable mounting means being adapted to hold a master scale for said meter, means to mount a blank scale fixedly upon said base, tracking means to track the indication of said meter, printing means to reproduce the master scale readings on said blank scale, means to move said sliding contact in synchronism with said tracking and printing means, and means to alter the position of said movable mounting means in response to the output of said tracking means.

3. In a system for calibrating and printing a scale for a meter designed to measure a physical condition applied thereto; a base, means to mount said meter fixedly upon said base, a source of the physical condition to be measured by said meter comprising a potentiometer having a resistor, means to connect said source to said meter comprising a sliding contact for said potentiometer, movable mounting means for said resistor, said movable mounting means being adapted to hold a master scale for said meter, means to mount a blank scale fixedly upon said base, tracking means to track the indication of said meter, printing means to reproduce the master scale readings on said blank scale, a shaft, means to mount said sliding contact and said tracking and printing means on said shaft, and means to alter the position of said movable mounting means in response to the output of said tracking means.

4. In a system for calibrating and printing a scale for a meter designed to measure a physical condition applied thereto: a base, means to mount said meter fixedly upon said base, a source of the physical condition to be measured by said meter comprising a potentiometer having a resistor, means to connect said source to said meter comprising a sliding contact for said potentiometer, movable mounting means for said resistor, said movable mounting means being adapted to hold a master scale for said meter, means to mount a photosensitive blank scale fixedly upon said base, tracking means to track the indication of said meter, printing means including a light source and a slit to reproduce the master scale readings on said blank scale, means to move said sliding contact in synchronism with said tracking and printing means, and means to alter the position of said movable mounting means in response to an error signal derived from said tracking means.

References Cited in the file of this patent

UNITED STATES PATENTS

| | | |
|---|---|---|
| 2,275,977 | Means et al. | March 10, 1942 |
| 2,300,803 | Pattee | Nov. 3, 1942 |
| 2,767,375 | Schramm | Oct. 16, 1956 |
| 2,858,509 | Glass | Oct. 28, 1958 |